(12) United States Patent
Yu et al.

(10) Patent No.: US 8,688,689 B2
(45) Date of Patent: Apr. 1, 2014

(54) TECHNIQUES FOR RECOMMENDING ALTERNATIVE SQL EXECUTION PLANS

(75) Inventors: Hailing Yu, San Jose, CA (US); Peter Belknap, Redwood City, CA (US); Benoit Dageville, Truckee, CA (US); Karl Dias, Foster City, CA (US); Khaled Yagoub, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 441 days.

(21) Appl. No.: 12/827,943

(22) Filed: Jun. 30, 2010

(65) Prior Publication Data

US 2012/0005189 A1 Jan. 5, 2012

(51) Int. Cl.
*G06F 7/00* (2006.01)
*G06F 17/30* (2006.01)

(52) U.S. Cl.
USPC ............................ 707/718; 707/713; 707/705

(58) Field of Classification Search
None
See application file for complete search history.

(56) References Cited

U.S. PATENT DOCUMENTS

| 7,499,909 B2* | 3/2009 | Liu et al. ................ 707/999.002 |
| 2005/0125393 A1* | 6/2005 | Yagoub et al. .................... 707/3 |
| 2007/0067274 A1* | 3/2007 | Han et al. ........................... 707/4 |
| 2009/0100004 A1* | 4/2009 | Andrei et al. ...................... 707/2 |
| 2009/0172544 A1* | 7/2009 | Tsui et al. ...................... 715/721 |
| 2012/0005188 A1 | 1/2012 | Yu et al. |

* cited by examiner

*Primary Examiner* — Jau-Shya Meng
(74) *Attorney, Agent, or Firm* — Kilpatrick Townsend & Stockton LLP (57) ABSTRACT

Techniques are provided for automatically recommending alternative execution plans for a SQL statement. Information pertaining to one or more execution plans for a SQL statement can be retrieved from a set of plan sources. The one or more execution plans can include the current execution plan for the statement and one or more historical execution plans. Based on the retrieved information, the performance of the one or more execution plans can be compared to each other. Based on the comparison, a recommendation can be provided to a user indicating that a particular execution plan (e.g., a historical execution plan) should be used in place of the current execution plan to execute the SQL statement.

14 Claims, 9 Drawing Sheets

TECHNIQUES FOR RECOMMENDING ALTERNATIVE SQL EXECUTION PLANS

CROSS-REFERENCES TO RELATED APPLICATIONS

The present disclosure is related to the following commonly assigned, co-pending U.S. patent application, which is incorporated herein by reference in its entirety for all purposes: application Ser. No. 12/827,926, filed concurrently with the present application, entitled "TECHNIQUES FOR RECOMMENDING PARALLEL EXECUTION OF SQL STATEMENTS."

BACKGROUND OF THE INVENTION

Embodiments of the present invention relate in general to databases, and in particular to techniques for aiding a user in tuning database performance by recommending alternative SQL execution plans.

Generally speaking, a SQL execution plan is a series of operations that indicate to a database server how to physically execute a SQL statement. A number of different execution plans can be used to execute any given statement. Consider, for instance, a SQL query that selects from an employee table all employees residing in the state of California (e.g., SELECT * FROM EMPLOYEES WHERE STATE="CA"). One execution plan for this query can read all of the rows in the employee table and select the rows that fulfill the condition STATE="CA" (referred to as a full table scan). Another execution plan can use a database index on the STATE column (if such an index exists) to find entries in the index data structure where STATE="CA" (thereby possibly avoiding a scan of the entire table). A component of the database server, typically called the optimizer, is responsible for choosing the optimal execution plan for a SQL statement given a particular database context.

In some cases, the optimizer may choose a new execution plan for a SQL statement that has a slower response time than a previously used execution plan. This may occur, for example, if the statistics for one or more database objects accessed by the SQL statement become stale or missing, or other reasons. In these scenarios, it may be desirable to have the optimizer return to using a previous (e.g., historical) execution plan for the statement. Unfortunately, there is currently no automated mechanism for aiding a user (e.g., a database administrator (DBA)) in identifying historical execution plans for a given SQL statement and determining whether to have the optimizer return to one of those historical plans.

BRIEF SUMMARY OF THE INVENTION

Embodiments of the present invention provide techniques for automatically recommending alternative execution plans for a SQL statement. In one set of embodiments, information pertaining to one or more execution plans for a SQL statement can be retrieved from a set of plan sources. The one or more execution plans can include the current execution plan for the statement and one or more historical execution plans. Based on the retrieved information, the performance of the one or more execution plans can be compared to each other. Based on the comparison, a recommendation can be provided to a user indicating that a particular execution plan (e.g., a historical execution plan) should be used in place of the current execution plan to execute the SQL statement. In some embodiments, the current execution plan may be the best performing plan, or a comparison between the current execution plan and historical execution plans cannot be performed. In these embodiments, information pertaining to the current and historical plans can be presented to the user for review.

According to one embodiment of the present invention, a method is provided that includes retrieving, by a computer system from a plurality of plan sources, information pertaining to one or more execution plans for a SQL statement, where the one or more execution plans have been previously used to execute the SQL statement. The method further includes comparing, by the computer system based on the information, the performance of the one or more execution plans and providing, by the computer system based on the comparing, a recommendation to a user indicating that a particular execution plan in the one or more execution plans should be used to execute the SQL statement.

In one embodiment, the plurality of plan sources are selected from a group consisting of: cursor cache, Automatic Workload Repository (AWR), SQL Tuning Set (STS), and SQL Performance Analyzer (SPA).

In one embodiment, the method further includes, prior to the retrieving, identifying the plurality of plan sources and associating a priority with each plan source in the plurality of plan sources.

In one embodiment, if an execution plan in the one or more execution plans exists in multiple plan sources, the information pertaining to the execution plan is retrieved from a plan source in the multiple plan sources associated with the highest priority.

In one embodiment, the information pertaining to the one or more execution plans includes SQL data, plan information, and execution statistics for each execution plan.

In one embodiment, the comparing includes attempting to reproduce each execution plan in the one or more execution plans that does not correspond to a current execution plan for the SQL statement, and if the one or more execution plans includes the current execution plan, comparing execution statistics for the reproducible execution plans and the current execution plan.

In one embodiment, comparing execution statistics for the reproducible execution plans and the current execution plan includes comparing elapsed times for the reproducible execution plans and the current execution plan.

In one embodiment, providing the recommendation to the user includes, if the one or more execution plans includes the current execution plan and if another execution plan in the one or more execution plans has better performance than the current execution plan, recommending creation of a SQL baseline profile for the SQL statement that specifies the another execution plan. Providing the recommendation to the user further includes, if the one or more execution plans does not include the current execution plan or if no other execution plans in the one or more execution plans have better performance than the current execution plan, providing to the user data pertaining to the current execution plan and any reproducible execution plans.

According to another embodiment of the present invention, a computer-readable storage medium have stored thereon program code executable by a computer system is provided. The program code includes code that causes the computer system to retrieve, from a plurality of plan sources, information pertaining to one or more execution plans for a SQL statement, where the one or more execution plans have been previously used to execute the SQL statement, and code that causes the computer system to compare, based on the information, the performance of the one or more execution plans. The program code further includes code that causes the computer system to provide, based on the comparing, a recommendation to a user indicating that a particular execution plan in the one or more execution plans should be used to execute the SQL statement.

According to another embodiment of the present invention, a computer system is provided. The computer system includes a processor configured to retrieve information pertaining to one or more execution plans for a SQL statement, where the one or more execution plans have been previously used to execute the SQL statement, and compare the performance of the one or more execution plans. The processor is further configured to provide a recommendation to a user indicating that a particular execution plan in the one or more execution plans should be used to execute the SQL statement.

A further understanding of the nature and advantages of the embodiments disclosed herein can be realized by reference to the remaining portions of the specification and the attached drawings.

DETAILED DESCRIPTION OF THE INVENTION

In the following description, for the purposes of explanation, numerous details are set forth in order to provide an understanding of embodiments of the present invention. It will be apparent, however, to one of ordinary skill in the art that certain embodiments can be practiced without some of these details.

Embodiments of the present invention provide techniques for automatically recommending alternative execution plans for a SQL statement. In one set of embodiments, information pertaining to one or more execution plans for a SQL statement can be retrieved from a set of plan sources. The one or more execution plans can include the current execution plan for the statement and one or more historical execution plans. Based on the retrieved information, the performance of the one or more execution plans can be compared to each other. Based on the comparison, a recommendation can be provided to a user indicating that a particular execution plan (e.g., a historical execution plan) should be used in place of the current execution plan to execute the SQL statement. In some embodiments, the current execution plan may be the best performing plan, or a comparison between the current execution plan and historical execution plans cannot be performed. In these embodiments, information pertaining to the current and historical plans can be presented to the user for review.

Figure 1:
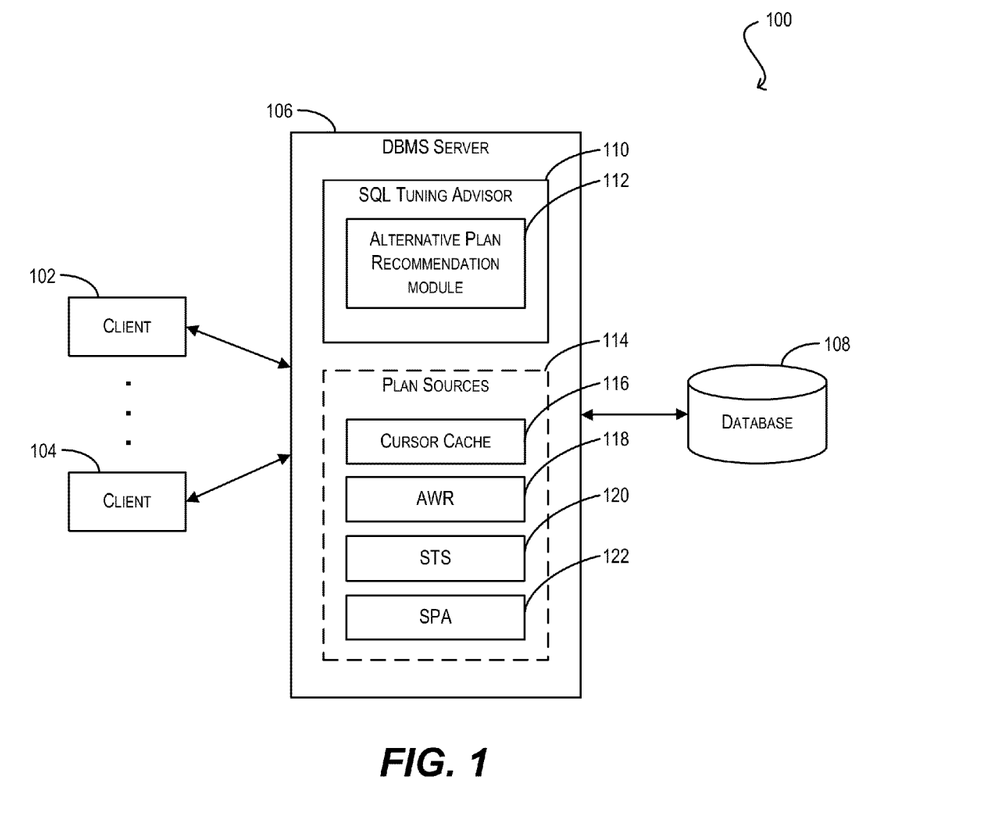
FIG. 1 is a simplified block diagram illustrating a system in accordance with an embodiment of the present invention.

FIG. 1 is a simplified block diagram illustrating a system 100 according to an embodiment of the present invention. As shown, system 100 can include one or more clients 102, 104 that are communicatively coupled with a database server 106. Database server 106 can be a software and/or hardware based component that provides services and access to a data store such as database 108. Examples of database servers can include, for instance, those commercially available from Oracle, Microsoft, Sybase, and IBM. In one set of embodiments, database server 106 and database 108 can be components of a relational database management system (RDBMS), such as Oracle 11g, that is adapted to store, update, and retrieve data in response to SQL-formatted commands. Although database server 106 and database 108 are shown as separate entities in system 100, one of ordinary skill in the art will appreciate that server 106 and database 108 can be resident on a single physical machine or separate physical machines.

In certain embodiments, database server 106 can include a SQL tuning advisor 110. SQL tuning advisor 110 can be a software and/or hardware-based tool that is adapted to provide recommendations to a user (e.g., a DBA) on how to improve the performance of SQL statements executed by database server 106. For example, a DBA operating client 102 or 104 can access database server 106 (e.g., via a graphical or command-line based interface) and can invoke SQL tuning advisor 110 with respect to a poorly-performing SQL statement. SQL tuning advisor can then carrying out one or more processing steps to determine the cause of the SQL statement's poor performance and provide recommendations to the DBA on how to improve that performance. An example of such as advisor is the SQL Tuning Advisor included in Oracle 11g.

In one set of embodiments, SQL tuning advisor 110 can include a number of modules, where each module is configured to analyze a particular aspect of SQL performance. For example, SQL tuning advisor 110 can include a module that is configured to analyze the statistics associated with database objects, a module that is configured to determine the existence of database indexes, a module that is configured to identify ways in which an execution plan can be restructured, and so on. When SQL tuning advisor 110 is invoked, each of these modules can be executed in turn on a poorly performing SQL statement to determine a number of different ways in which performance can be improved.

In a particular set of embodiments, SQL tuning advisor 110 can include an alternative plan recommendation module 112 (in addition to zero or more other modules as described above). As discussed in the Background section, in some cases the optimizer component of a database server can choose a new execution plan for a SQL statement that has a slower response time than a previously used execution plan. In these scenarios, it may be desirable to have the optimizer return to using a previous (e.g., historical) execution plan for the statement. However, it can be difficult for a user/administrator of the database system to find the historical execution plans for a given SQL statement, let alone determine whether a particular historical plan would provide better performance than the statement's current plan.

To address this, alternative plan recommendation module 112 can provide an automated mechanism that identifies the historical execution plans for a SQL statement, compares their performance to each other and to the current execution plan, and provides an appropriate recommendation regarding whether one of the historical plans should be used in place of the current plan. For instance, a DBA operating client 102 or 104 can invoke SQL tuning advisor 110 and can request an alternative plan recommendation with respect to a poorly-performing SQL statement. In response, SQL tuning advisor 110 can invoke alternative plan recommendation module 112, which can automatically perform various processing steps to identify historical execution plans for the SQL statement that provide better performance than the current execution plan. If appropriate, alternative plan recommendation module 112 can then generate a recommendation for the DBA indicating that a particular historical plan should be used in place of the current plan for executing the SQL statement. The specific processing performed by alternative plan recommendation module 112 is discussed in greater detail below.

In one set of embodiments, alternative plan recommendation module 112 can access one or more plan sources 114 for finding information (e.g., plan lines, execution statistics, etc.) about the historical (and current) execution plans for a SQL statement. Generally speaking, plan sources 114 represent various repositories and/or modules that are likely to have information about execution plans that have been previously executed by database server 106. For example, plan sources 114 can include a cursor cache 116, which is an in-memory cache of database server 106 that is used to quickly access the execution plans of the most frequently executed SQL statements. Plan sources 114 can further include an automatic workload repository (AWR) 118, which is a module that periodically stores a snapshot of high-load SQL statements in the system for logging purposes. Plan sources 114 can further include a SQL tuning set (STS) 120, which is information for a particular SQL statement or group of statements (e.g., execution plan, execution statistics, etc.) that can be manually captured and stored by a DBA. Plan sources 114 can further include a SQL performance analyzer (SPA) 122, which is a tool that executes SQL statements to test their performance and maintains information regarding the tested statements. Other types of plan sources may also exist and are contemplated to be within the scope of the present invention.

It should be appreciated that system 100 of FIG. 1 is illustrative and not intended to limit embodiments of the present invention. For example, although plan sources 114 are shown as being resident on database server 106, one or more of plan sources 114 can be resident on database 108, or on a different machine or data repository that is not shown in FIG. 1. In addition, the various entities depicted in system 100 can have other capabilities or include other components that are not specifically described. One of ordinary skill in the art will recognize many variations, modifications, and alternatives.

Figure 2:
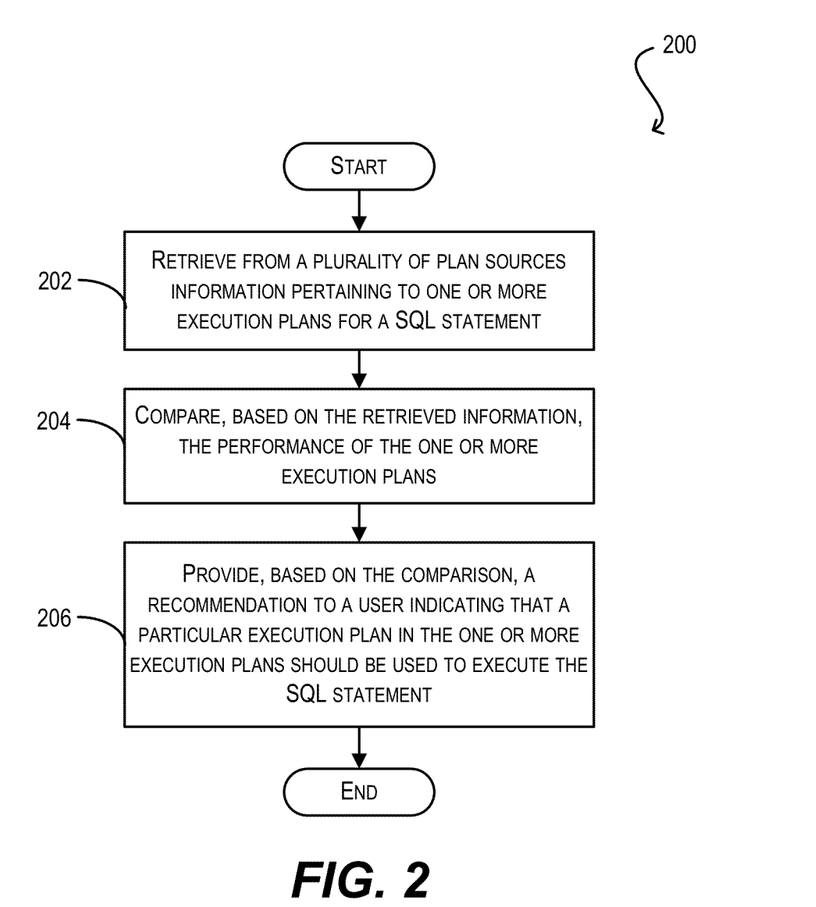
FIG. 2 is a flow diagram illustrating a process for recommending alternative execution plans for a SQL statement in accordance with an embodiment of the present invention.

FIG. 2 is a flow diagram illustrating a process 200 for recommending alternative execution plans for a SQL statement according to an embodiment of the present invention. In one set of embodiments, process 200 can be carried out by alternative plan recommendation module 112 of FIG. 1. Process 200 can be implemented in hardware, software, or a combination thereof. As software, process 200 can be encoded as program code stored on a machine-readable storage medium.

At block 202, module 112 can retrieve, from plan sources 114 of FIG. 1, information pertaining to one or more execution plans for a given SQL statement. The information can include, inter alia, SQL data (e.g., SQL text, SQL ID, parsing schema, etc.), plan information (e.g., plan hash value, plan lines, optimizer environment, etc.), execution statistics (e.g., CPU time, CPU execution count, elapsed time, buffer reads, etc.), the plan source name, and a timestamp (i.e., when the plan was executed).

In some embodiments, plan sources 114 may not have information about the current execution plan for the SQL statement. For example, the current plan may be so new that the statement has not yet been executed using the current plan (and thus does not appear as a previously executed plan in plan sources 114). In these embodiments, the information retrieved at block 202 may only pertain to historical execution plans. In other embodiments, plan sources 114 may not have information about any historical execution plans for the SQL statement. For example, all of historical plans may be so old that they have already been aged out of the plan sources. In these embodiments, the information retrieved at block 202 may only pertain to the current execution plan. In yet other embodiments, plan sources 114 may have information about both the current execution plan and one or more historical execution plans. In these embodiments, the information retrieved at block 202 may pertain to both current and historical execution plans.

Figure 3:
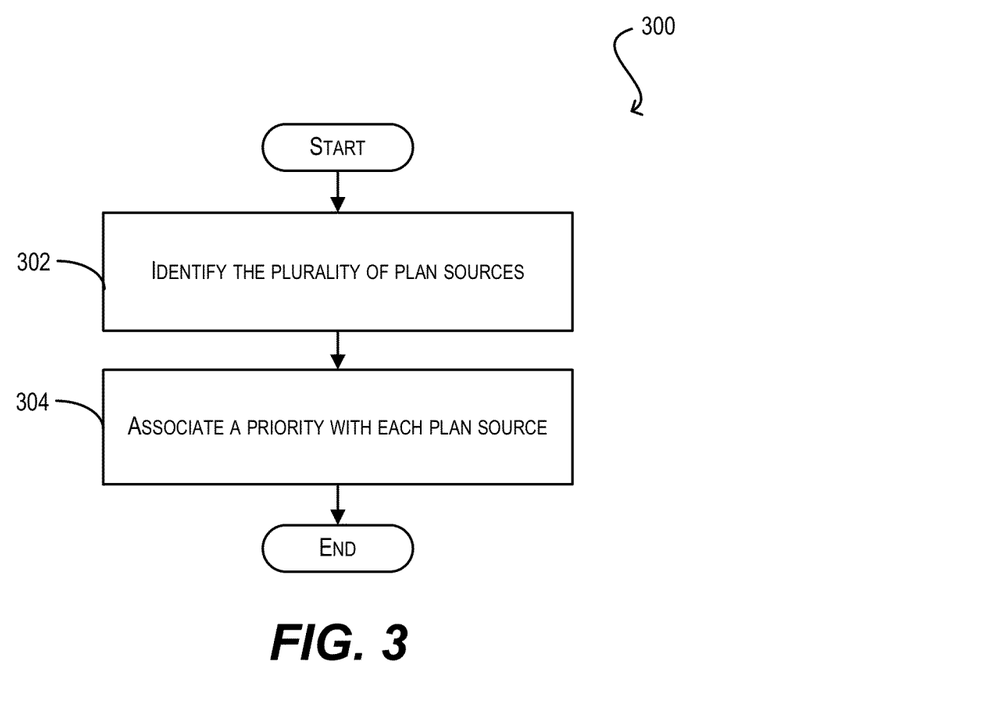
FIG. 3 is a flow diagram illustrating a process for identifying and prioritizing plan sources in accordance with an embodiment of the present invention.

In certain instances, the same execution plan may appear in two or more of plan sources 114. For example, one execution of the plan may cause it to appear in AWR 118, while another execution of the same plan may cause it to appear in cursor cache 116. In these scenarios, module 112 may not know which plan source contains the most recent (and thus, the most relevant) data, such as execution statistics, for the plan. To address this, FIG. 3 illustrates a process 300 whereby module 112 can, prior to the processing of block 202, prioritize the plan sources to be used. For example, at block 302, module 112 can identify all of the plan sources. At block 304, module 112 can assign a priority to each identified plan source, where the priority is used to resolve conflicts in the case that the same execution plan appears in multiple sources. In various embodiments, the plan sources can be prioritized such that higher priority sources are more likely to store fresh (i.e., recent) statistics about the plan than lower priority sources. This reduces or minimizes the likelihood that module 112 will retrieve stale or otherwise inaccurate plan data as part of the processing of block 202.

In a particular embodiment, SPA 122 can be considered the highest priority plan source if alternative plan recommendation module 112 is invoked in the context of a SPA session. If module 112 is not invoked in the context of a SPA session, SPA 122 can be disregarded as a plan source. The remaining priority list can include cursor cache 116, AWR 118, and STS 120, in that order. It should be appreciated that this is an exemplary ordering and that other priority orderings are possible.

Returning to FIG. 2, once module 112 has retrieved information pertaining to execution plans for the SQL statement, module 112 can compare, based on the retrieved information, the performance of the plans (block 204). In this manner, module 112 can determine whether it makes sense, from a performance perspective, to recommend returning to a historical execution plan.

Figure 4:
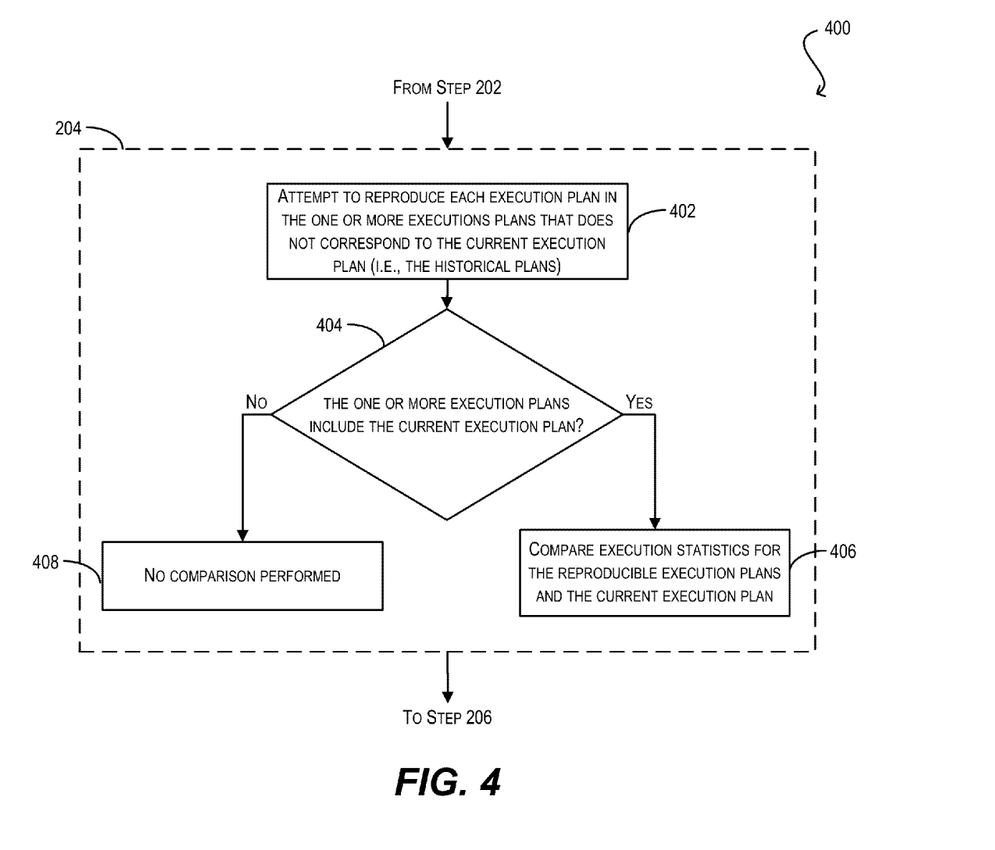
FIG. 4 is a flow diagram illustrating a process for comparing the performance of execution plans in accordance with an embodiment of the present invention.

FIG. 4 illustrates a process 400 that can be executed by module 112 as part of the processing of block 204. As shown in FIG. 4, module 112 can attempt to reproduce each historical execution plan identified at block 202 (block 402). In certain embodiments, this is necessary to filter out historical plans that can no longer be run in the current optimizer environment. A historical plan can become irreproducible if, for example, an object that was previously used by the plan does not exist anymore in the current environment. In one set of embodiments, attempting to reproduce a plan can comprise attempting compilation of the plan.

At block 404, a determination can be made whether the execution plans found in plan sources 114 at block 202 of FIG. 2 include the current execution plan. As described above, module 112 may not be able to retrieve information about the current execution plan from plan sources 114 if, for example, the plan has not yet been executed. If the execution plans found in plan sources 114 include the current execution plan, the execution statistics for the reproducible, historical plans and the current plan can be compared (block 406). Thus, module 112 can identify the best performing plan from among all of the usable, alternative plans for the SQL statement. In certain embodiments, module 112 can specifically compare the elapsed time of the various plans (where a lower elapsed time is better). In alternative embodiments, other performance metrics, such as CPU time, I/O operations, or the like can be compared.

If the execution plans found in plan sources 114 do not include the current execution plan, no comparisons can be performed (block 408). This is because module 112 does not have access to any execution statistics for the current plan, and thus does not have any basis for determining whether the current plan performs worse than historical plans.

It should be appreciated that process 400 is illustrative and that variations and modifications are possible. Steps described as sequential can be executed in parallel, order of steps can be varied, and steps can be modified, combined, added, or omitted. One of ordinary skill in the art would recognize many variations, modifications, and alternatives.

Returning to FIG. 2, once the performance of the various execution plans for the SQL statement have been compared, module 112 can generate (if appropriate) a recommendation for a user indicating that an alternative execution plan (e.g., one of the historical execution plans) should be used in place of the current execution plan to execute the SQL statement (block 206). In one set of embodiments, generating the recommendation can include providing to the user a simple mechanism for reverting to the recommended alternative execution plan, as well as generating a user interface that provides information about the relative performance of the recommended and current plans.

Figure 5:
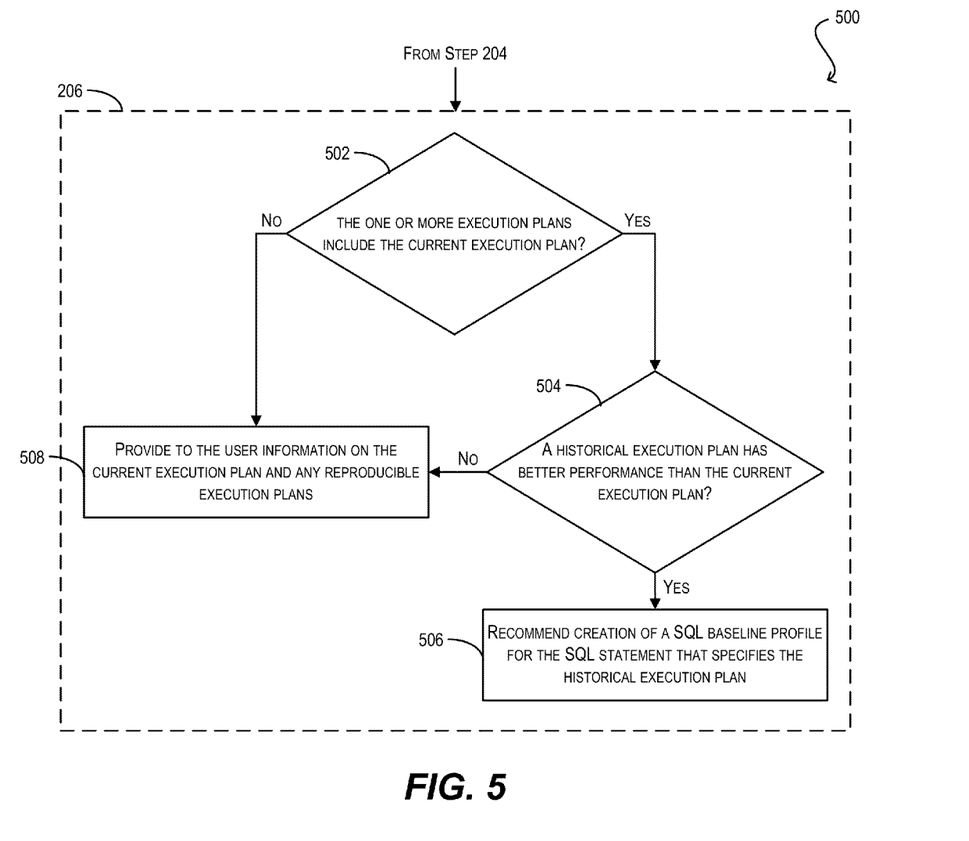
FIG. 5 is a flow diagram illustrating a process for recommending to a user that a particular execution plan should be used (in place of the current execution plan) for executing an SQL statement in accordance with an embodiment of the present invention.

FIG. 5 illustrates a process 500 that can be executed by module 112 as part of the processing of block 206. If (1) the execution plans found in plan sources 114 at block 202 of FIG. 2 include the current execution plan (as determined at block 404 of FIG. 4), and if (2) a particular historical execution plan has better performance than the current execution plan (as determined at block 406 of FIG. 4), then module 112 can recommend creation of a SQL baseline profile for the SQL statement that specifies the historical execution plan (blocks 502-506). Accordingly, when the SQL statement is executed, the optimizer can reference the SQL baseline profile and execute the statement using the specified historical plan (rather than the current plan).

Figure 6:
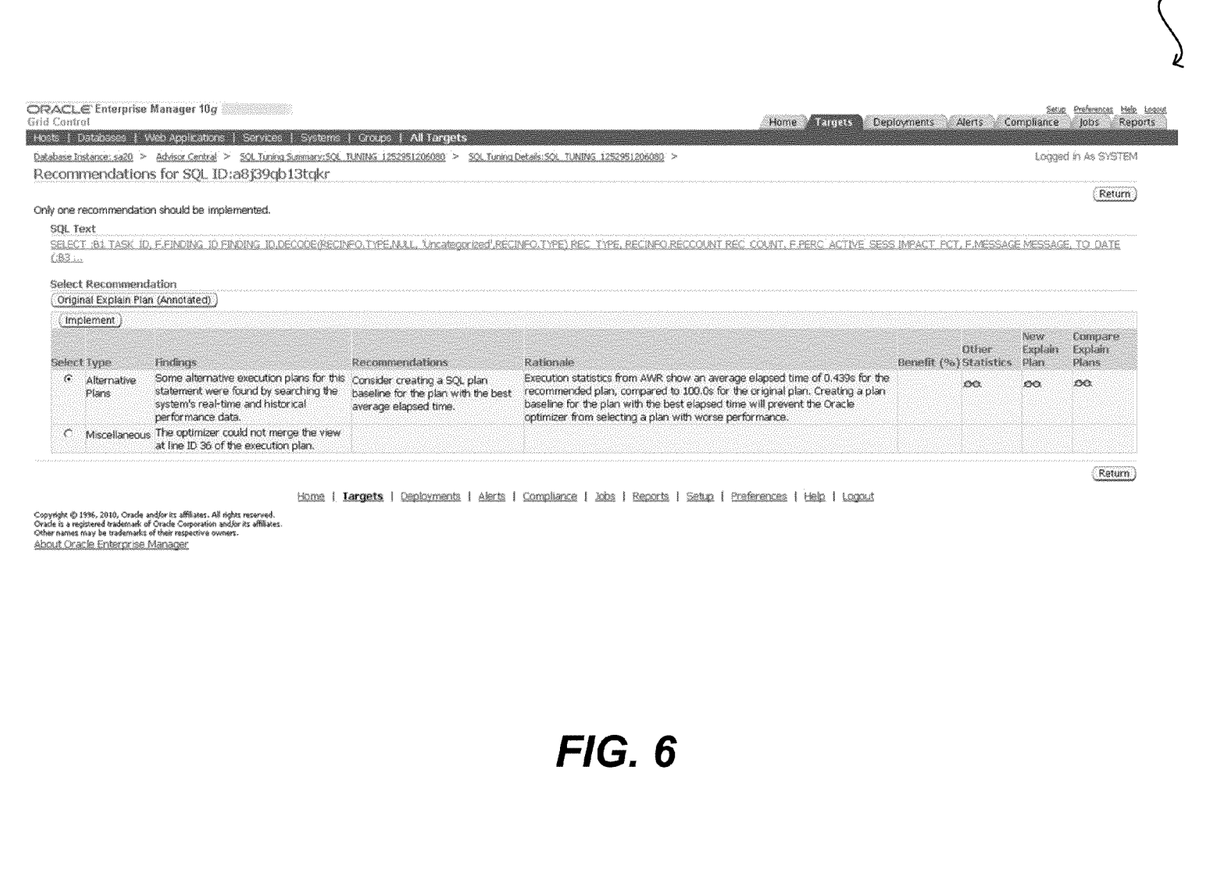
FIGS. 6 and 7 are example user interfaces in accordance with an embodiment of the present invention.

FIG. 6 illustrates an example user interface 600 generated by module 112 that provides this recommendation to a user and that indicates the relative performance (in elapsed time) of the recommended and current execution plans. In certain embodiments, user interface 600 can include a control that, when activated, automatically creates the recommend SQL baseline profile for the user.

Figure 7:
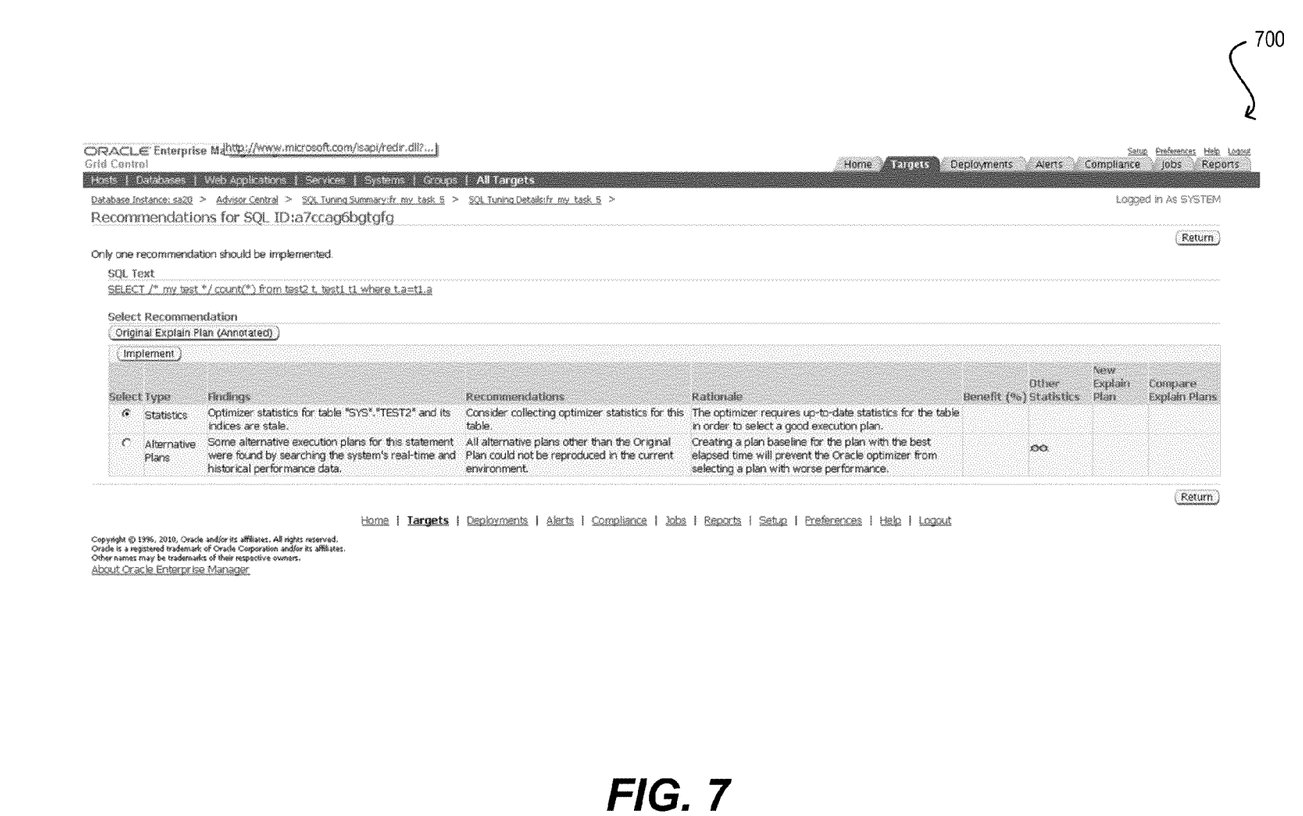

If (1) the execution plans found in plan sources 114 at block 202 of FIG. 2 do not include the current execution plan (as determined at block 404 of FIG. 4), or if (2) no reproducible historical execution plans have better performance than the current execution plan (as determined at block 406 of FIG. 4), then no alternative plan recommendation can be provided to the user (blocks 502, 504, 508). In this scenario, module 112 can simply provide information to the user about the current plan and any reproducible historical plans. Using that information, the user (e.g., a DBA) can make a decision on whether to revert to a particular historical plan, or to keep using the current plan. FIG. 7 illustrates an example user interface 700 generated by module 112 that indicates that there are no reproducible historical plans (and thus there are no alternative plans that can be recommended).

It should be appreciated that processes 200 and 500 are illustrative and that variations and modifications are possible. Steps described as sequential can be executed in parallel, order of steps can be varied, and steps can be modified, combined, added, or omitted. One of ordinary skill in the art would recognize many variations, modifications, and alternatives.

Figure 8:
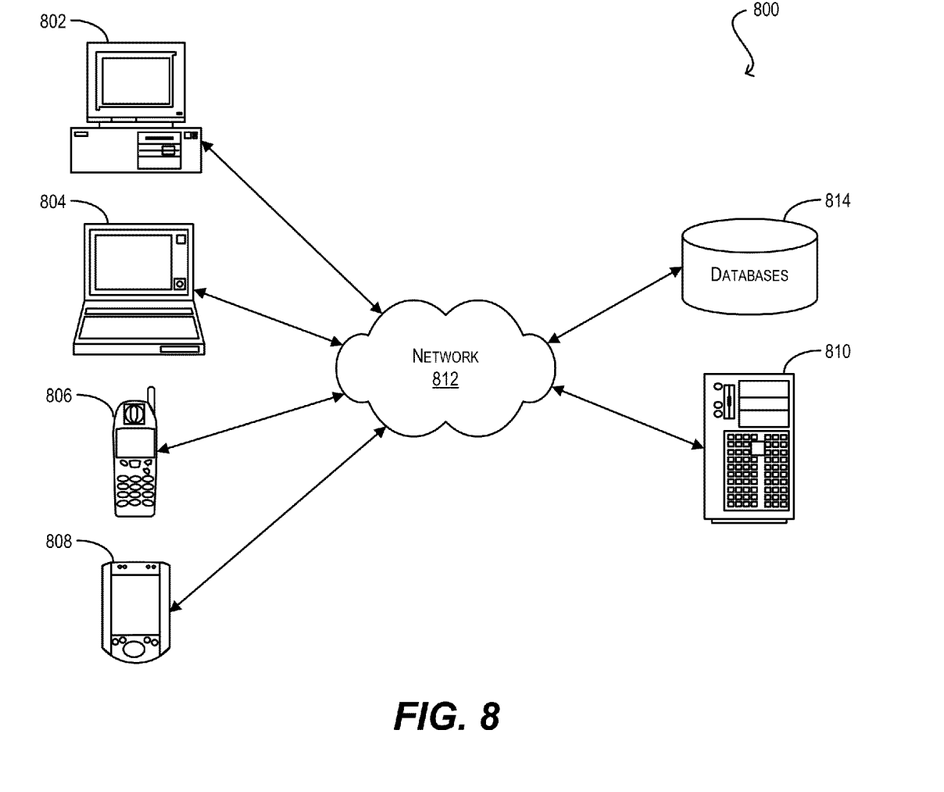
FIG. 8 is a simplified block diagram illustrating a system environment that can be used in accordance with an embodiment of the present invention.

FIG. 8 is a simplified block diagram illustrating a system environment 800 that can be used in accordance with an embodiment of the present invention. As shown, system environment 800 can include one or more client computing devices 802, 804, 806, 808, which can be configured to operate a client application such as a web browser, a UNIX/Solaris terminal application, and/or the like. In various embodiments, client computing devices 802, 804, 806, 808 can correspond to clients 102, 104 of FIG. 1, and can be operated by one or more users to invoke and interact with SQL tuning advisor 110 and/or alternative plan recommendation module 112.

Client computing devices 802, 804, 806, 808 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 802, 804, 806, 808 can be any other electronic device capable of communicating over a network, such as network 812 described below. Although system environment 800 is shown with four client computing devices, it should be appreciated that any number of client computing devices can be supported.

System environment 800 can further include a network 812. Network 812 can be any type of network familiar to those skilled in the art that can support data communications using a network protocol, such as TCP/IP, SNA, IPX, AppleTalk, and the like. Merely by way of example, network 812 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 800 can further include one or more server computers 810 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Server 810 can run an operating system including any of those discussed above, as well as any commercially available server operating system. Server 810 can also run any of a variety of server applications and/or mid-tier applications, including web servers, FTP servers, CGI servers, Java virtual machines, and the like. In one set of embodiments, server 810 can run a database server application such as database server 106 of FIG. 1.

System environment 800 can further include one or more databases 814. In one set of embodiments, databases 814 can include databases that are managed by server 810 (e.g., database 108 of FIG. 1). Databases 814 can reside in a variety of locations. By way of example, databases 814 can reside on a storage medium local to (and/or resident in) one or more of computers 802, 804, 806, 808, and 810. Alternatively, databases 814 can be remote from any or all of computers 802, 804, 806, 808, and 810, and/or in communication (e.g., via network 812) with one or more of these. In one set of embodiments, databases 814 can reside in a storage-area network (SAN) familiar to those skilled in the art.

Figure 9:
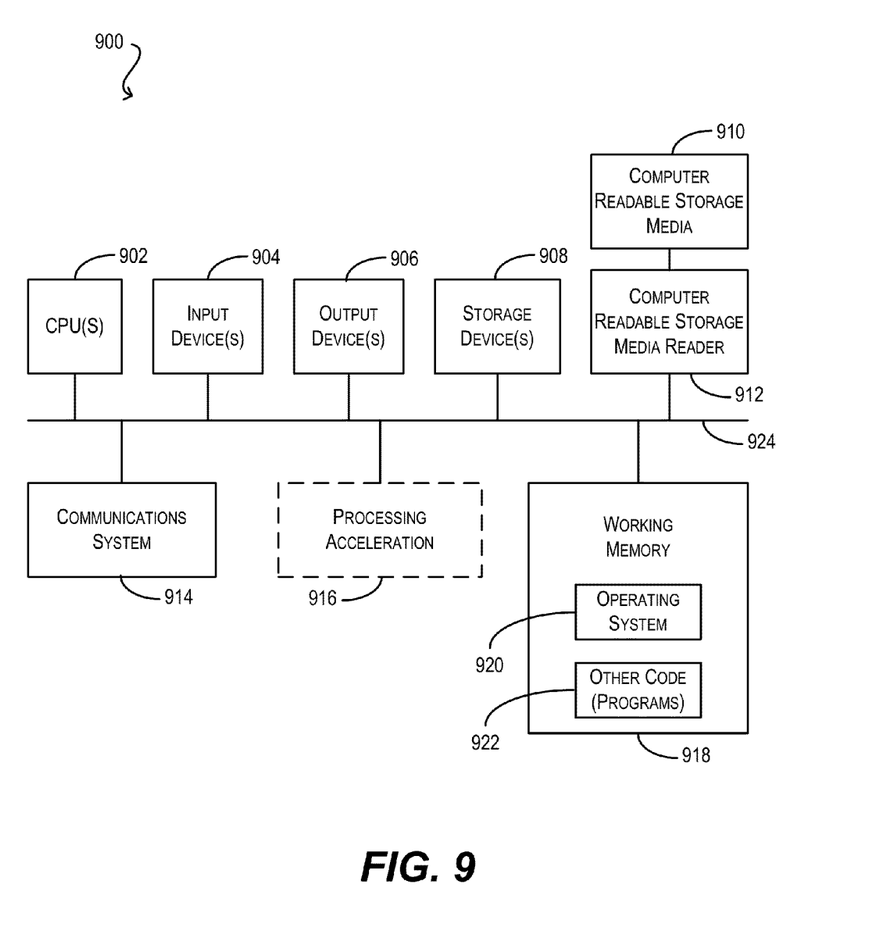
FIG. 9 is a simplified block diagram illustrating a computer system that can be used in accordance with an embodiment of the present invention.

FIG. 9 is a simplified block diagram illustrating a computer system 900 that can be used in accordance with an embodiment of the present invention. In various embodiments, computer system 900 can be used to implement any of computers 802, 804, 806, 808, and 810 described with respect to system environment 800 above. As shown, computer system 900 can include hardware elements that are electrically coupled via a bus 924. The hardware elements can include one or more central processing units (CPUs) 902, one or more input devices 904 (e.g., a mouse, a keyboard, etc.), and one or more output devices 906 (e.g., a display device, a printer, etc.). Computer system 900 can also include one or more storage devices 908. By way of example, the storage device(s) 908 can include devices such as disk drives, optical storage devices, and solid-state storage devices such as a random access memory (RAM) and/or a read-only memory (ROM), which can be programmable, flash-updateable and/or the like.

Computer system 900 can additionally include a computer-readable storage media reader 912, a communications subsystem 914 (e.g., a modem, a network card (wireless or wired), an infra-red communication device, etc.), and working memory 918, which can include RAM and ROM devices as described above. In some embodiments, computer system 900 can also include a processing acceleration unit 916, which can include a digital signal processor (DSP), a special-purpose processor, and/or the like.

Computer-readable storage media reader 912 can be connected to a computer-readable storage medium 910, together (and, optionally, in combination with storage device(s) 908) comprehensively representing remote, local, fixed, and/or removable storage devices plus storage media for temporarily and/or more permanently containing computer-readable information. Communications system 914 can permit data to be exchanged with network 812 and/or any other computer described above with respect to system environment 800.

Computer system 900 can also comprise software elements, shown as being currently located within working memory 918, including an operating system 920 and/or other code 922, such as an application program (which may be a client application, Web browser, middle tier/server application, etc.). It should be appreciated that alternative embodiments of computer system 900 can have numerous variations from that described above. For example, customized hardware can be used and particular elements can be implemented in hardware, software, or both. Further, connection to other computing devices such as network input/output devices can be employed.

Computer readable storage media for containing code, or portions of code, executable by computer system 900 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, an any other medium that can be used to store data and/or program code and that can be accessed by a computer.

Although specific embodiments of the invention have been described above, various modifications, alterations, alternative constructions, and equivalents are within the scope of the invention. For example, the techniques described above are not limited to recommending alternative execution plans for SQL-formatted statements; rather, they can be used to recommend alternative plans for any type of database query language statement. Further, although embodiments of the present invention have been described with respect to certain flow diagrams and steps, it should be apparent to those skilled in the art that the scope of the present invention is not limited to the described diagrams/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method comprising:
    receiving, by a computer system, an SQL statement;
    identifying, by the computer system, a plurality of plan sources, wherein each plan source stores information pertaining to one or more execution plans, and wherein the information pertaining to the one or more execution plans includes execution statistics for each execution plan;
    determining, by the computer system, a priority for each plan source in the plurality of plan sources;
    retrieving, by the computer system, from the plurality of plan sources, information pertaining to the one or more execution plans for the SQL statement, the one or more execution plans having been previously used to execute the SQL statement;
    wherein the retrieving comprises, on determining an execution plan in the one or more execution plans exists in multiple plan sources, retrieving the information pertaining to the execution plan from a plan source in the multiple plan sources associated with a highest priority;
    comparing, by the computer system, execution statistics of the one or more execution plans based on the information pertaining to the one or more execution plans; and
    providing, by the computer system based on the comparing, a recommendation to a user-indicating a particular execution plan in the one or more execution plans to be used to execute the SQL statement.

2. The method of claim 1 wherein the plurality of plan sources are selected from a group consisting of: cursor cache, Automatic Workload Repository (AWR), SQL Tuning Set (STS), and SQL Performance Analyzer (SPA).

3. The method of claim 1 wherein the information pertaining to the one or more execution plans further includes SQL data and plan information.

4. The method of claim 1 wherein the comparing comprises:
reproducing each execution plan in the one or more execution plans that does not correspond to a current execution plan for the SQL statement; and
on determining the one or more execution plans includes the current execution plan, comparing execution statistics for the reproducible execution plans and the current execution plan.

5. The method of claim 4 wherein comparing execution statistics for the reproducible execution plans and the current execution plan comprises comparing elapsed times for the reproducible execution plans and the current execution plan.

6. The method of claim 4 wherein providing the recommendation to the user comprises:
on determining the one or more execution plans includes the current execution plan and on determining another execution plan in the one or more execution plans has better performance than the current execution plan, recommending creation of a SQL baseline profile for the SQL statement that specifies the another execution plan; and
on determining the one or more execution plans does not include the current execution plan or on determining no other execution plans in the one or more execution plans have better performance than the current execution plan, providing to the user data pertaining to the current execution plan and any reproducible execution plans.

7. A non-transitory computer-readable storage medium storing instructions which when executed by one or more processors cause the one or more processors to:
receive an SQL statement;
identify a plurality of plan sources, wherein each plan source stores information pertaining to one or more execution plans, and wherein the information pertaining to the one or more execution plans includes execution statistics for each execution plan;
determine a priority for each plan source in the plurality of plan sources;
retrieve, from the plurality of plan sources, information pertaining to the one or more execution plans for the SQL statement, the one or more execution plans having been previously used to execute the SQL statement;
wherein the retrieving comprises, on determining an execution plan in the one or more execution plans exists in multiple plan sources, retrieving the information pertaining to the execution plan from a plan source in the multiple plan sources associated with a highest priority;
compare the execution statistics of the one or more execution plans based on the information pertaining to the one or more execution plans; and
provide, based on the comparing, a recommendation to a user indicating a particular execution plan in the one or more execution plans to be used to execute the SQL statement.

8. The non-transitory computer-readable storage medium of claim 7 wherein the plurality of plan sources are selected from a group consisting of: cursor cache, Automatic Workload Repository (AWR), SQL Tuning Set (STS), and SQL Performance Analyzer (SPA).

9. The non-transitory computer-readable storage medium of claim 7 wherein the instructions further comprise instructions that cause the one or more processors to:
reproduce each execution plan in the one or more execution plans that does not correspond to a current execution plan for the SQL statement; and
compare execution statistics for the reproducible execution plans and the current execution plan on determining the one or more execution plans includes the current execution plan.

10. The non-transitory computer-readable storage medium of claim 9 wherein the instructions that provide the recommendation to the user comprise instructions that cause the one or more processors to:
recommend, on determining the one or more execution plans includes the current execution plan and on determining another execution plan in the one or more execution plans has better performance than the current execution plan, creation of a SQL baseline profile for the SQL statement that specifies the another execution plan; and
provide to the user, on determining the one or more execution plans does not include the current execution plan or on determining no other execution plans in the one or more execution plans have better performance than the current execution plan, data pertaining to the current execution plan and any reproducible execution plans.

11. A system comprising:
a processor and a memory stores instructions, the instructions executed by the processor to:
receive an SQL statement;
identify a plurality of plan sources, wherein each plan source stores information pertaining to one or more execution plans, and wherein the information pertaining to the one or more execution plans includes execution statistics for each execution plan;
determine a priority for each plan source in the plurality of plan sources;
retrieve, from the plurality of plan sources, information pertaining to the one or more execution plans for the SQL statement, the one or more execution plans having been previously used to execute the SQL statement;
wherein the retrieving comprises, on determining an execution plan in the one or more execution plans exists in multiple plan sources, retrieving the information pertaining to the execution plan from a plan source in the multiple plan sources associated with a highest priority;
compare the execution statistics of the one or more execution plans based on the information pertaining to the one or more execution plans; and
provide a recommendation to the user indicating a particular execution plan in the one or more execution plans should to be used to execute the SQL statement.

12. The system of claim 11 wherein the plurality of plan sources are selected from a group consisting of: cursor cache, Automatic Workload Repository (AWR), SQL Tuning Set (STS), and SQL Performance Analyzer (SPA).

13. The system of claim 11 wherein the comparing comprises:
reproducing each execution plan in the one or more execution plans that does not correspond to a current execution plan for the SQL statement; and
on determining the one or more execution plans includes the current execution plan, comparing execution statistics for the reproducible execution plans and the current execution plan.

14. The system of claim 13 wherein providing the recommendation to the user comprises:
on determining the one or more execution plans includes the current execution plan and on determining another execution plan in the one or more execution plans has better performance than the current execution plan, recommending creation of a SQL baseline profile for the SQL statement that specifies the another execution plan; and on determining the one or more execution plans does not include the current execution plan or on determining no other execution plans in the one or more execution plans have better performance than the current execution plan, providing to the user data pertaining to the current execution plan and any reproducible execution plans.

* * * * *